United States Patent [19]

Lewis, III

[11] Patent Number: 5,770,090

[45] Date of Patent: Jun. 23, 1998

[54] METHOD FOR RECOVERY OF HEAVY METAL FROM WASTE WATER

[76] Inventor: Tom Lewis, III, R.D. #3, Box 135, New Alexandria, Pa. 15670

[21] Appl. No.: 650,959

[22] Filed: May 21, 1996

Related U.S. Application Data

[63] Continuation of Ser. No. 317,200, Oct. 3, 1994, abandoned, which is a continuation-in-part of Ser. No. 20,206, Feb. 19, 1993, abandoned, which is a continuation-in-part of Ser. No. 387,165, Jul. 28, 1989, abandoned.

[51] Int. Cl.$^6$ ..................................................... C02F 1/28
[52] U.S. Cl. ........................ 210/662; 205/287; 210/677; 210/688; 210/913
[58] Field of Search ............................ 204/194; 210/677, 210/688, 912, 913, 662, 668, 669, 670; 423/54, DIG. 14; 205/287

[56] References Cited

U.S. PATENT DOCUMENTS 4,652,352  3/1987  Saieva ................................. 204/105 R

OTHER PUBLICATIONS

Bowers et al., *Proq. Wat. Tech.*, "Activated Carbon Processes for the Treatment of Chromium (VI)–Containing Industrial Watewaters", vol. 12, pp. 629–649 (1980).

Landrigan et al. *National Technical Information Service*, "Removal of Chromium from Plating Rinse Water Using Activated Carbon", EP–570/2–75–055, pp. 1–43 (1975).

*Primary Examiner*—Ivars Cintins
*Attorney, Agent, or Firm*—Price & Adams

[57] ABSTRACT

A waste water stream containing a heavy metal such as chromium, zinc, copper, and the like is directed from a source after pH adjustment to a tank containing adsorption material in the form of granular activated carbon. A waste water stream is directed to the tank in either an upward or downward flow mode. The heavy metal is adsorbed onto the surface of the adsorption material which is pretreated to an initial pH in the range between about 1.5 to 2.5. The water stream free of the metal contaminant is directed to an effluent tank for safe discharge. Thereafter a stripping solution preferably containing sulfuric acid is circulated through the tank to remove the adsorbed metal for the adsorption material. The metal is carried by the stripping solution from the tank to an electrolytic metal recovery unit. The unit includes a cathode terminal and the stripping solution passes through a voltage potential resulting in electrolytic deposit of the heavy metal onto the cathode terminal. The stripping solution free of the heavy metal is returned to a tank for reuse in the adsorption process. The cathode terminal is removed from the metal recovery unit to allow recovery of the metal for reuse.

14 Claims, 5 Drawing Sheets

METHOD FOR RECOVERY OF HEAVY METAL FROM WASTE WATER

CROSS REFERENCE TO RELATED APPLICATIONS

This application is a continuation of application Ser. No. 317,200 filed on Oct. 3, 1994, now abandoned, which was a continuation-in-part of Ser. No. 020,206, filed Feb. 19, 1993, now abandoned, which was a continuation-in-part of Ser. No. 387,165, filed Jul. 28, 1989, now abandoned, entitled "Method And Apparatus For Recovery of Heavy Metal From Waste Water".

BACKGROUND OF THE INVENTION

1. Field of the Invention

This invention relates to method and apparatus for recovering heavy metal such as chromium, zinc, copper, mercury and the like, from the waste water streams and more particularly to a process for removing heavy metal components from an effluent stream by adsorption of the heavy metal on a medium and thereafter stripping the adsorbed metal from the medium and recover by electrolytic deposition.

2. Description of the Prior Art

The treatment of heavy metal bearing effluent streams to prevent the discharge of pollutants in waterways has become the subject of federal legislation. The Environmental Protection Agency (EPA) has been charged with enforcing effluent limitations in publishing guidelines for the discharge of electroplating wastes into waterways. The need for such legislation has resulted from the use of chromium chemicals in metal treating operations, such as plating, anodizing, conversion coatings, corrosion inhibition, picking, and brightening. These limitations also extend to the discharge of other plating solutions containing copper, nickel, zinc, cyanides, as well as chromium.

Chromium substances have also been commonly used to minimize the effect of biofouling and precipitation in recirculation cooling towers. Chromium substances are circulated throughout the cooling tower to minimize these adverse effects. In the blowdown operation of a cooling tower the chromium is discharged. It is the effluent from cooling towers which has been the subject of EPA mandated limitations.

The limitations of effluents containing heavy metals are expressed in terms of the pollutant concentration in parts per million or milligrams per liter. As a result a metal plating shop is allowed to discharge a definite weight of pollutant, and the weight is related to the area plated. The EPA mandated effluent limitations require that chemical treatment methods include destruction of cyanide by oxidation, reduction of hexavalent chromium to the trivalent form, neutralization and co-precipitation of metals as hydroxides or hydrated oxides with settling and clarification to remove suspended solids prior to discharge.

The chemical treatment of heavy metal effluent by the electroplating industry has been practiced for many years. The disposal techniques are classified as either destructive or recovery. The most common method of chromium waste is first to reduce the hexavalent to trivalent form and then by pH adjustment to precipitate chromium as a hydroxide. Some conventional reducing agents for chromium waste are sodium metabisulfite, sodium bisulfite, sodium sulfite, sodium hydrosulfite, sulfur dioxide, and ferrous sulfate.

Conventionally the waste is pumped into one of several reacting and setting tanks which are used in rotation. The tank first serves as a holding tank to smooth out variations in concentration, then as a mixing and treating tank, and finally as a settling tank for removing precipitated chromium hydroxide. The rate of reduction of hexavalent chromium with sodium metabisulfite is pH-dependent. At a pH of 2.5 to 3.0 the reaction takes about 30 minutes after which a sample of the waste is then analyzed for hexavalent chromium concentration. The required amount of reduction agent is calculated and added slowly to the agitated waste. At the completion of the reduction the hexavalent chrome is reduced to trivalent form.

After the reduction step the pH is raised to 7.5–9.0 with lime or other alkalies. As a result chromium and other metal ions precipitate as hydroxides. Lime or soda ash is used to neutralize the waste, but a substantial sludge volume is created which in itself is considered "hazardous" and must be properly disposed of in a hazard waste landfill in accordance with mandated federal guidelines. Complying with the guidelines adds to the expense of the overall treatment process. This is particularly acute in the continuous treatment of chromium wastes where the chromium hydroxide sludge is concentrated by lagooning and/or centrifuging.

Other known methods for treatment of heavy metal effluents include electrolytic reduction. An electrolytic cell is employed using a semiconductive bed of carbonaceous particles between the electrodes. Under an applied DC potential, the semiconductive particles exhibit bipolar properties and maintain higher conductivity than that of the water rinse solution being treated. In a typical unit rinse water containing 100 to 200 parts per million of hexavalent chromium enters the cell at a pH of about 2.0–3.0. The voltage potential is maintained at about 12 volts. Trivalent chromium is disposed of by adjusting the pH with alkalies to precipitate metal hydroxides which again must be properly disposed of.

It is also known to remove chromium from waste effluents as barium chromates by additions of barium carbonate and an acidic constituent. In this process chromium bearing waste is acidified with hydrochloric acid, nitric acid, or barium nitrate. The heavy metal chromates are converted to the chloride or nitrate salt. The pH of the solution is such that barium chromate and hydroxides of other metals precipitate from the solution. The precipitate is removed from the settling tank and the supernatant liquid is returned to the last water rinse tank or discarded. Additional expense and treatment is required for the discarded solution which may contain some barium and treated to precipitate insoluble barium salts.

Another process for treating chromium rinse waters is the activated carbon process, as disclosed in "Activated Carbon Process for the Treatment of Chromium (VI)-Containing Industrial Wastewaters", *Prog. Wat. Tech.*, Vol. 12, pages 629 and 649 by Bowers et al. (1980), where rinse waters containing hexavalent chromium are passed through a carbon bed. The carbon bed can be regenerated either with sulfuric acid or with sodium hydroxide as disclosed in "Removal of Chromium from Plating Rinse Water -Using Activated Carbon", *National Technical Information Service*, EPA-570/2-75-055, pages 1–43 by Landrigan et al. (1975).

In the ion-exchange process as disclosed in U.S. Pat. No. 4,652,352 for treatment of chromium rinse waters chromic acid anodizing solution is passed through oxidation resistant cation exchange resins. Aluminum and trivalent chromium aluminum are retained on the resin and the purified solution returned to the bath. When chromic acid containing rinse water is passed through a cation and then through an anion exchanger the undesirable ions are removed and the demineralized effluent can be returned to the process stream for rinse purposes. After regeneration of the anion exchanger with sodium hydroxide, chromic acid can be recovered by passing the chromate through a cation exchanger.

It also known to treat heavy metal waste effluents by electrodialysis that utilizes a membrane separation process in which ions are transferred through an ion selective membrane as the result of the application of a direct current. The membranes can be one of the two types, either an anion-selective membrane or a cation-selective membrane. With a cation selective membrane the solution to be treated is placed in a compartment between an anode and cathode exchange membrane. A dilute acid solution generally is placed in the other compartment. As voltage is applied, the positive ions are attracted towards the cathodes and the negative ions toward the anode. As cation-permeable membrane allows transport of positive ions from the anode to the cathode compartment, a separation of unwanted cations from a solution is accomplished.

In a unit utilizing cation-permeable membranes chromic acid solution containing trivalent chromium, iron, zinc, copper, etc. is introduced into the anode compartment of the electrodialysis cell. On application of electrical potential, iron, copper, zinc and trivalent chromium pass through a cation-permeable membrane into the catholyte solution. At the same time, some of the trivalent chromium is oxidized to the hexavalent form at the anode.

Further examples of processes and devices for removing chromium from solutions by precipitating the metal onto plates are disclosed in U.S. Pat. Nos. 3,761,381; 3,848,738; 4,157,942 and 4,171,255. U.S. Pat. Nos. 3,973,987 discloses the use of a carbon bed and filtering during a process to cleanup solutions contaminated with heavy metals. Further U.S. Pat. 4,652,352 discloses the capture of metals from dilute solutions using ion exchange and optionally recovering the metals utilizing electrolytic recovery.

While various methods are known to treat heavy metal bearing effluents for the removal of metal contaminants, the known devices not only require substantial capital investment for equipment costs but create a secondary problem in the disposal of the recovered pollutant, particularly for disposal of the sludge which is extracted from the recovery process. The sludge must be handled in a manner that meets the requirements of disposal of solid wastes. Metallic sludges when mixed with garbage and organic wastes are likely to go back into solution as organic acids. When the pollutant is recovered as a metallic salt strict procedures must be followed to process them as a sanitary waste. Therefore there is need for method and apparatus in the treatment of heavy metal effluents that eliminates the problems associated with toxic metal sludges and produces an effluent stream which is environmentally safe.

SUMMARY OF THE INVENTION

In accordance with the present invention there is provided a method for reclaiming heavy metal from waste water comprising the steps of adjusting the pH of the waste water to a range between about 2 to 9. The surface of a bed adsorption material is pretreated by a chemical solution to have a pH in a range between about 2 to 9. The waste water is passed in a stream through the pretreated bed of adsorption material. The heavy metal present in the waste water stream is adsorbed onto the surface of the adsorption material. The waste water free of heavy metal is directed away as an effluent from the bed of adsorption material for discharge.

The pH of the effluent stream exiting the bed adsorption material is monitored. An increase in the pH of the effluent stream to a preselected control point is detected. An acid solution of a preselected pH is supplied to reactivate the bed of adsorption material when the pH of the effluent stream reaches the control point. The acid solution is maintained in contact with the bed of adsorption material for a preselected period of time until the pH of the surface of the bed adsorption material is restored to a preselected pH level. A stripping solution is passed through the bed of adsorption material to strip the heavy metal from the surface of the adsorption material. The heavy metal in the stripping solution is electrolytically deposited onto a cathode terminal. The heavy metal deposited on the cathode terminal is recovered. The stripping solution is retained for reuse in subsequent cycles for stripping heavy metal from the surface of the adsorption material.

Further in accordance with the present invention, there is provided a method for recovering chromium from a waste water stream comprising the steps of adjusting the pH level of the chromium containing waste water stream to a range between of the chromium containing waste water stream to a range between about 2 to 6. A bed of activated carbon is pretreated for removing the chromium from the waste water stream by circulating in a closed loop a solution containing 10% to 20% by volume sulfuric acid through the bed of activated carbon for a preselected period of time until the pH of the surface of the bed reaches a level of 1.5 to 2.5. The waste water stream containing hexavalent chromium is directed through the bed of adsorption material. The hexavalent chromium is adsorbed onto the surface of the activated carbon bed. The hexavalent chromium is converted to trivalent chromium on the surface of the activated carbon bed. A stripping solution containing 10% to 20% by volume sulfuric acid is passed through the activated carbon bed to strip the trivalent chromium from the bed. The pH of the stripping solution is maintained at a level between about 1.5 to 2.5 by feeding fresh acid as required for the continuous stripping of trivalent chromium. The stripping solution containing concentrated trivalent chromium is directed to an electrolytic recovery unit. Trivalent chromium from the stripping solution is electrolytically deposited onto a cathode terminal of the electrolytic recovery unit. The deposited chromium is removed from the cathode terminal.

Additionally, the present invention is directed to apparatus for extraction of heavy metal from a waste water stream that includes a controller for adjusting the pH of the heavy metal laden stream to a range between about 2 to 6. A tank containing a bed of activated carbon is connected to the controller for receiving the heavy metal laden stream. The activated carbon bed has a deposit surface for adsorbing the heavy metal. Means is provided for extracting waste water from the tank free of the heavy metal. A stripping solution is circulated through the tank to remove the heavy metal from the deposit surface of the activated carbon bed. Means is provided for replacing in the tank the bed of activated carbon with a regenerated bed of activated carbon when the activated carbon has exhausted its capacity to adsorb the heavy metal. Means is provided for feeding the exhausted activated carbon to a columnar vessel. An acid flow is directed in one direction through the columnar vessel as the exhausted activated carbon is directed in a countercurrent direction through the columnar vessel so that the acid strips the carbon of heavy metal to clean the carbon and restore the carbon to its initial condition for adsorbing heavy metal. Means is provided for returning the cleaned carbon to the tank for reuse. An electrolytic metal recovery unit is connected to the tank for receiving the stripping solution containing the heavy metal. The recovery unit includes a cathode terminal and means for electrically charging the cathode terminal to electrolytically attract heavy metal onto the cathode terminal. Means is provided for removing the heavy metal for reuse from the cathode surface.

Accordingly, a principal object of the present invention is to provide method and apparatus for reclamation of heavy metals from cooling tower recirculation waters, metal plating process waters and other basic metal handling and treating industry effluents for reuse.

Another object of the present invention is to provide method and apparatus for treating hazardous chromium containing liquid waste to separate and reclaim the chromium from the process stream in a form suitable for recycling and reuse.

Another object of the present invention is to provide apparatus for the treatment of effluent streams containing heavy metal waste without generating a sludge considered hazardous for waste treatment.

An additional object of the present invention is to provide a process for treating chromium containing waste by extraction of chromium in trivalent form onto the surface of an adsorption material for recovery of the chromium for reuse.

Another object of the present invention is to provide method and apparatus for obtaining a high grade of chromium from a waste water stream without producing toxic metal sludges and serving as a source for reusable chromium.

These and other objects of the present invention will be more completely disclosed and described in the following specification, the accompanying drawings and the appended claims.

DESCRIPTION OF THE PREFERRED EMBODIMENTS

Figure 1:
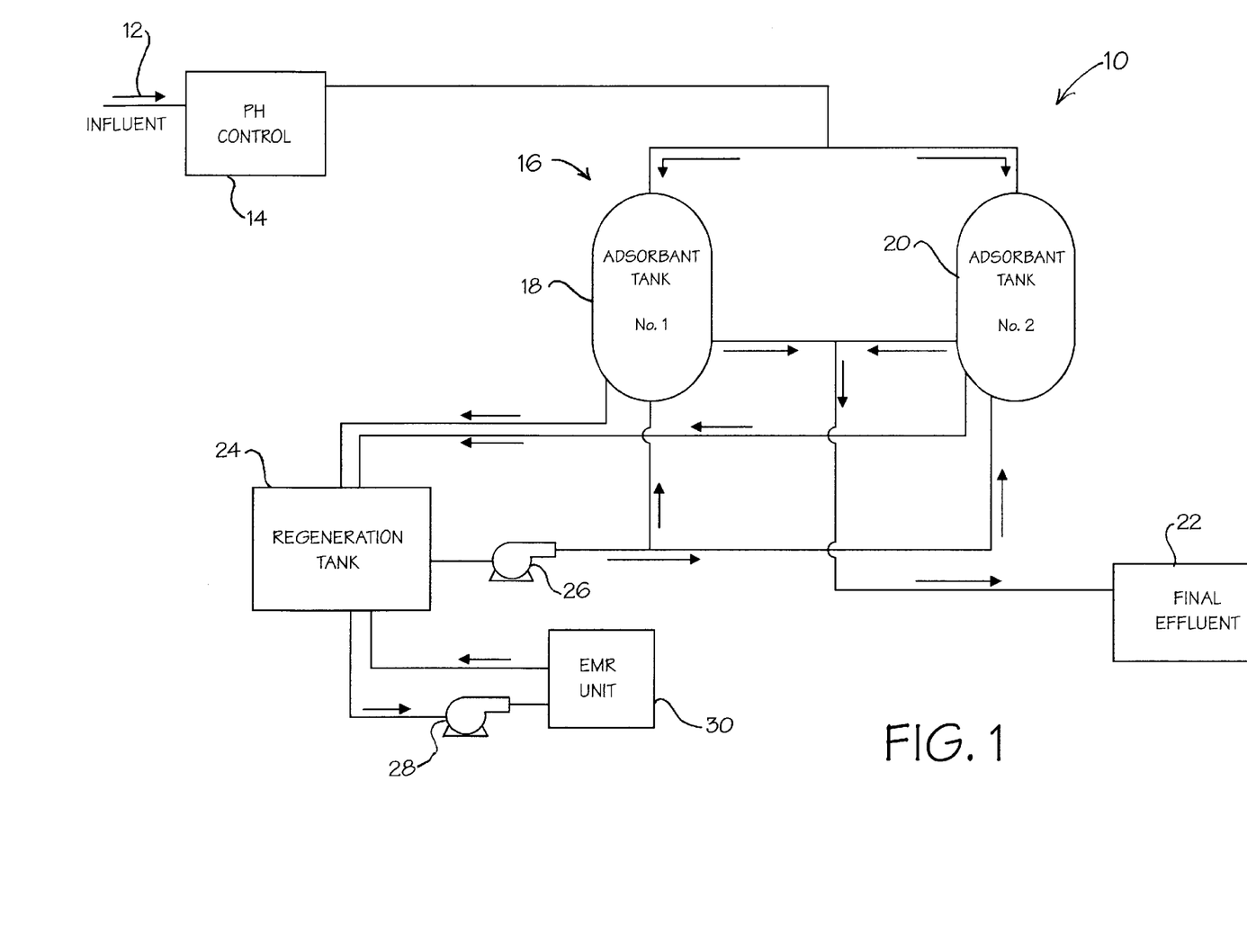
FIG. 1 is a schematic illustration of the apparatus used for recovering heavy metal from an effluent stream in accordance with the present invention.
Figure 2:
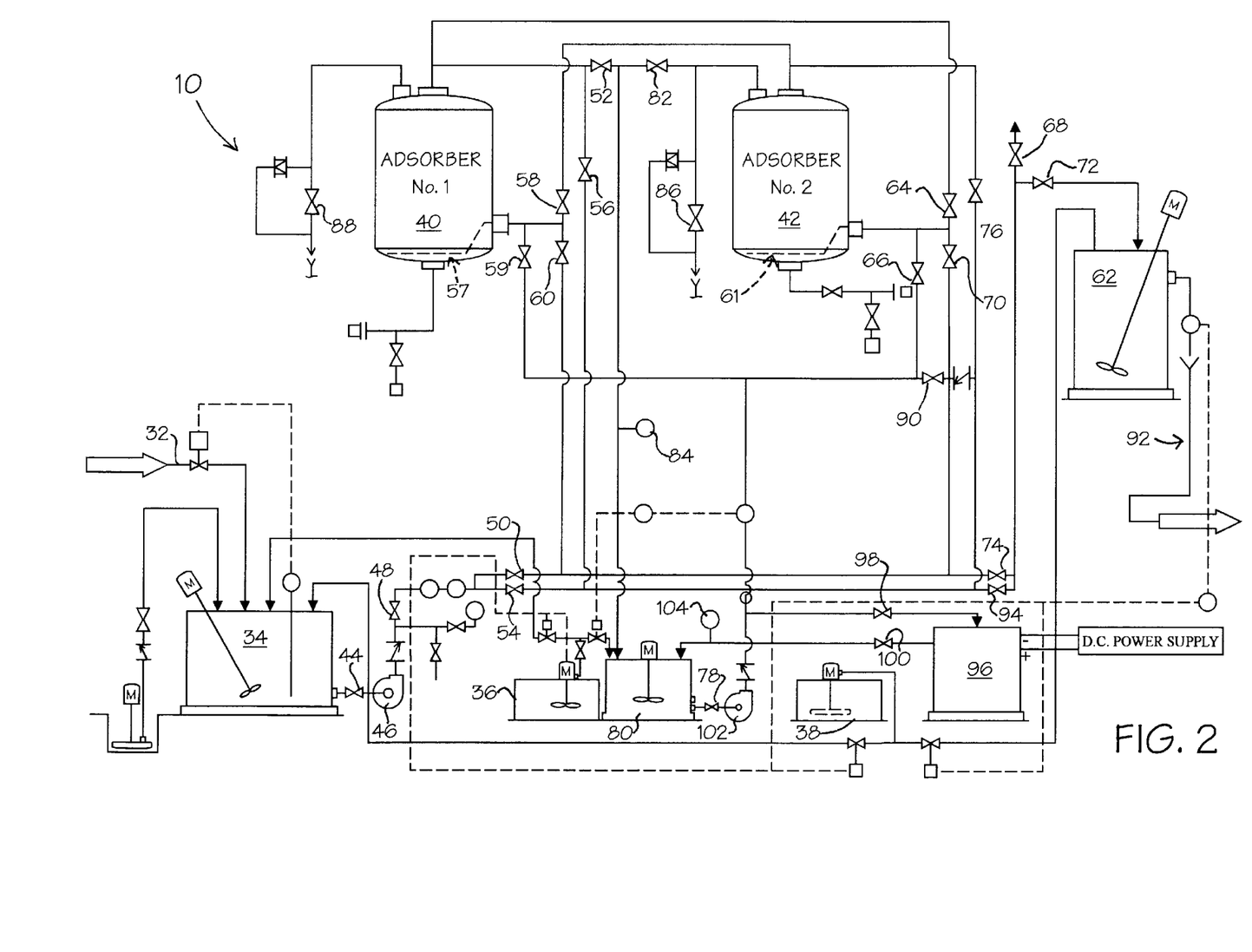
FIG. 2 is a diagrammatic illustration of the apparatus shown in FIG. 1.

Referring to the drawings and particularly to FIG. 1, there is illustrated apparatus, generally designated by the numeral 10, for removing and recovering from a waste water stream a heavy metal pollutant, such as chromium, iron, zinc, copper, etc. The pollutant is recovered as a solid metal product capable for reuse. Initially, an effluent 12 in the form of a waste water stream containing a heavy metal, such as chromium, is diverted, as for example, from a cooling tower, through a pH controller 14 for adjusting the pH of the waste water to a level between 2 to 6. The effluent is then directed to an adsorption device, generally designated by the numeral 16, that includes in one embodiment a pair of tanks or vessels 18 and 20. In FIG. 1 the tanks 18 and 20 are shown in a down flow mode of operation but may be operated in an up flow mode of operation, as shown in FIG. 2 and described hereinafter.

The tanks 18 and 20 each contain a bed of activated carbon which is pretreated in accordance with the present invention to have a preselected pH for enhancing the adsorption of the heavy metal components from the effluent stream. In the case of chromium, the activated carbon in the tanks 18 and 20 adsorb the chromium onto the surface of the carbon adsorption material which is pretreated with a 10%-20% by volume sulfuric acid solution for a preselected period of time until the pH of the surface of the activated carbon bed reaches a pH level of between about 1.5 to 2.5 in tanks 18 and 20. As a result, the chromium is reduced from hexavalent form to trivalent form on the surface of the adsorption material. The effluent exits the tanks 18 and 20 free of metal contamination and is directed to the final effluent tank 22 which is provided with pH control and an agitator.

Thereafter in a regeneration step the trivalent chromium is stripped from the adsorption medium in tanks 18 and 20 by circulating through the tanks a stripping solution, such as sulfuric acid in an amount 10–20% by volume. In this manner the chromium is removed from the surface of the adsorption medium. The stripping solution is maintained in a regeneration tank 24 which is connected by conventional valving to both of the adsorption tanks 18 and 20. Preferably the pH of the stripping solution is maintained at a level between about 1.5 to 2.5 by feeding fresh acid thereto as required for the continuous stripping of trivalent chromium.

Tanks 18 and 20 are separately regenerated. For example, pump 26 directs the stripping solution through an open and closed sequence of valves which first directs the stripping solution in a closed loop upwardly through tank 18 and back to regeneration tank 24. Then in a second path the stripping solution is directed in a closed loop up and through tank 20 and back to regeneration tank 24. After regeneration both tanks 18 and 20 are opened to allow the stripping solution remaining to flow back to regeneration tank 24.

After regeneration of the tanks 18 and 20 they are cleaned by pumping water through them and allowing the rinse water to drain to the regeneration tank 24. In one mode of operation tanks 18 and 20 are sequentially operated. While tank 18 operates to adsorb the heavy metal onto the surface of the adsorption medium, tank 20 is being stripped of the adsorbed contaminant. Then tank 20 is placed in the first or primary stage and tank 18 is stripped.

As also will be explained later in greater detail and illustrated in FIG. 2, the apparatus 10 is also operated in an up flow mode where the waste water is pumped upwardly through tanks 18 and 20 and final effluent directed to tank 22. In the up flow mode while tank 18 is functioning in the first or primary stage, tank 20 is being stripped of the adsorbed contaminant. Then the process is reversed for tanks 18 and 20 in the up flow mode of operation as above described for the down flow mode. Both tanks are also rinsed in the up flow mode after the stripping solution is drained from each tank.

From the regeneration tank 24 the stripping solution containing the heavy metal, such as trivalent chromium, is directed by pump 28 to an electrolytic metal recovery (EMR) unit 30. In the EMR unit 30 the metal for example trivalent chromium, is electrically deposited onto the surface of a cathode terminal. The stripping solution is passed at a optimum rate through the EMR unit 30 at a potential of about 6–12 volts with a cathode current density ranging from between about 20 to 200 amp/ft$^2$. The cathode terminal is removed from the unit 26 and the deposited metal is stripped from the cathode surface.

The stripping solution is then recycled from the EMR unit 30 back to tank 24. From the tank 24 the regenerated stripping solution is available for further use in the regeneration of tanks 18 and 20. From the regeneration tanks the 10%–20% by volume sulfuric acid is used to pretreat the adsorption material. In this manner the efficiency of the tanks 18 and 20 to adsorb the heavy metal from the effluent stream is maintained so that the final effluent in tank 22 is environmentally safe and free of toxic metal sludges.

With the closed loop operation of the present invention stripping of the heavy metal from the bed of adsorption material occurs simultaneously with the pretreatment of the adsorption material. By pretreating the adsorption material to come into contact with a solution of a specific pH, either acidic or caustic, the surface of the adsorption material is treated to the pH of the surrounding chemical solution.

Now referring to FIG. 2, there is illustrated in detail the apparatus 10 schematically illustrated in FIG. 1. Process waste water containing heavy metal, such as chromium, is directed through conduit 32 from a source of the waste water and fed into tank 34 for temporary storage. Tank 34 includes an agitator, level controller, and pH controller. In the case of acid, the pH of the waste water is adjusted in a range between about 2 to 6. The pH controller adds acid or caustic materials from tanks 36 and 38 respectively. The pH adjusted waste water from tank 34 is then pumped through a granular activated carbon system that includes adsorber tanks 40 and 42 which are operable sequentially in either a down flow or up flow mode and individually regenerated as above described. The down flow and up flow modes of operation are each described in detail hereinafter.

DOWN FLOW MODE

Sequence No. 1

In a down flow mode of operation of the present invention, valve 44 is open to feed pump 46 from which the waste water flows through open valve 48, while valves 50 and 52 are closed so that the fluid is directed through open valves 54 and 56 to the top of adsorber tank 40. Suitable process valves for the present invention are ball valves with a polypropylene lining. Preferably the instrument valves are electronically operated solenoid units of a plastic and stainless steel construction. Commercially available pumps operable for use in the recirculation and regeneration processes are magnetic drive centrifugal pumps, such as those supplied by March Manufacturing Co. under Model no. DP-6TMD.

The waste water proceeds through the adsorber tank 40 and exits therefrom through an underdrain system, generally designated by the numeral 57 positioned in the bottom of the tank 40. From the tank 40 the water proceeds through open valve 58 while valves 59 and 60 remain closed. From valve 58 the water enters the second adsorber tank 42.

The adsorber tanks 40 and 42 are identical in design and commercially available from Calgon Carbon Corp. under the trademark "Filtrasorb 400". Both tanks utilize granular activated carbon, and are fabricated of steel and skid mounted.

Each includes conventional pipes, valves and fittings. The tanks are lined with an abrasion flake glass coating identified as "Flakeline-16" and available from Ceilcote Coatings Inc.

The waste water proceeds downwardly through adsorber tank 42 and exits through a second underdrain system, generally designated by the numeral 61. The water leaving adsorber tank 42 is substantially free of metal contamination. The water is routed to final effluent tank 62 by closing valves 64, 66 and 68 and opening valves 70, 72 and 74. The final effluent tank 62 includes a pH controller for monitoring the pH of the effluent entering the tank 62 and an agitator.

The water leaving adsorber tank 42 is of sufficient quality that it can be used in the process as makeup water. This is accomplished by closing valve 72 and opening valve 68 so that the stream of water can be routed back to the feed tank 34.

Sequence No. 2

In a second mode of operation, adsorber tank 40 is regenerated and adsorber tank 42 is placed in the primary stage of operation. The carbon adsorber is repeatedly treated on-line by a chemical solution to restore the surface of the carbon bed to a preferred initial pH level, for example 2.0. Pretreatment is accomplished by circulating through the bed a 10% to 20% by volume sulfuric acid solution for a preselected period of time until the pH of the surface of the bed reaches a level of 1.5 to 2.5.

In operation valve 56 is first closed and valve 76 opened. By opening valve 76, water is permitted to enter the top of adsorber tank 42 and exit from the effluent tank 62. Regeneration of adsorber tank 40 is commenced by opening valve 78 connected to regeneration tank 80. Valve 66 is closed, and valve 59 is opened with valves 58 and 60 being closed. Consequently the acid regenerant solution is circulated through adsorber tank 40 and exits from the top of the tank and is then directed through open valve 52 with valve 82 closed so that the effluent is recycled back through and into regenerant tank 80.

The recirculation step is continued until a test probe 84 connected to the line leading to the regenerant tank 80 indicates that the adsorbed metal ions have been stripped from the activated carbon bed in adsorber tank 40. A suitable test probe for use with the present invention is available from Sethco Inc. as model RTC-D.

The solution from adsorber tank 42 is drained back to the regeneration tank 80 by opening valve 86 which is connected in a manner not shown to the regeneration tank 80. Thereafter clean water, as from a municipal system, is rinsed through the adsorption tanks 40 and 42 by first closing valve 88 connecting regeneration tank 80 to adsorber tank 40 and opening valve 90 which is connected to a clean water source (not shown) . Also in this operation valve 59 is opened and valve 78 is closed. This permits clean water to be recirculated through the adsorber tank 40 and then collected in the regeneration tank 80. Once this stripping operation for adsorber tank 40 is completed, it is ready to be returned to service in the adsorption mode of operation.

Sequence No. 3

In a similar manner, adsorber tank 42 is placed in operation while adsorber tank 40 is regenerated. This is accomplished by first opening valves 76 and 64, while closing valves 66 and 70. Consequently water now enters the top of adsorber tank 42 through valve 76 and exits therefrom through valve 64 and is routed to adsorber tank 40. The water exists the underdrain system 57 of adsorber tank 40, while valve 60 is opened and valves 52, 58 and 59 are closed.

The effluent from adsorber tank 40 then proceeds through open valves 60, 74 and 72, while valve 68 is maintained closed. Consequently, the final effluent is directed through tank 62 from which it can be discharged through the outlet system, generally designated by the numeral 92 where the effluent is of a quality that can be readily handled by a municipal water authority. On the other hand, if this water is to be recycled to the process area, valve 72 is closed and valve 68 is opened.

Sequence No. 4

To regenerate adsorber tank 42 while effluent is redirected downwardly through adsorber tank 40, valves 56 and 60 are opened and valves 52, 58 and 59 are closed. With this arrangement, adsorber tank 40 is operable to process the waste water. The water exits through valves 60, 74 and 72 to effluent tank 62. Then to regenerate adsorber tank 42, valves 78, 66 and 82 are opened, while valves 64, 70 and 52 are closed.

The regeneration solution is recirculated through adsorber tank 42 in an upward flow mode and recycled through valve 82 back to regeneration tank 80. After a sufficient period of time of regeneration, as indicated by the test probe 84, which is preferably a conductivity meter, the regeneration cycle is completed. The solution is then gravity drained back to regeneration tank 80 by opening valve 86.

Adsorber tank 42 is then rinsed with clean water, as for example, clean water from a municipal system, by opening valves 90, 66, and 82; while valves 64, 70, and 52 are closed. Preferably two bed volumes of city water are rinsed through the adsorber tanks during the regeneration cycle.

When adsorber tank 42 is being regenerated and adsorber tank 40 is in a primary stage of operation, water enters adsorber tank 40 through valve 56 and exits through valve 58, while valves 59 and 60 are maintained closed. The water then exits the second adsorber tank 42 through valves 70, 74 and 72, while valves 66, 64 and 76 are closed.

In the above sequences of operation a 10%–20% by volume sulfuric acid solution from the regeneration tank is used to pretreat the adsorption material until the surface of the adsorption material reaches a pH level in the range 1.5 to 2.5. Also, the effluent pH is constantly monitored so that in the event the effluent exceeds a preselected pH level, for example above 5.0, the adsorption material is reactivated by exposing the material to the sulfuric acid solution to restore the adsorption material to the initial preferred pH, for example 2.0. The acid for reactivating the adsorption material is also supplied from the regeneration tank.

UP FLOW MODE

Sequence No. 1

Further in accordance with the present invention, the apparatus 10 is operated in a upward flow mode where waste water is pumped from the feed tank 34 through valves 44, 48, 50 and 60; while, valves 54, 59 and 58 are maintained closed. The water exits the top of adsorber tank 40 and is routed through open valve 64 and enters the underdrain system 61 of adsorber tank 42 and exits through the top thereof through open valves 76, 94, and 72 to effluent tank 62. During this stage, valves 66, 70, 74, and 68 are maintained closed.

If it is desired to recycle the water through the process area, then valve 68 is opened and valve 72 is closed. To regenerate adsorber tank 40 while adsorber tank 42 is placed in operation, valves 70, 76, 94 and 72 are open; while, valves 66, 64, 74, and 68 are closed. With this valving sequence, the water is directed to effluent tank 62.

Sequence No. 2

In order to regenerate adsorber tank 40, acid from regeneration tank 80 is pumped through open valves 78, 59 and 52, which recycles the acid back to the regeneration tank 80. During this valving sequence, valves 60, 58 and 56 are maintained closed. The test probe 84 is monitored to determine at what point the regeneration process is completed. Upon completion the acid is drained back into tank 80 by opening valve 88. The adsorber tank 40 is then rinsed with clean water by opening valves 90 and 59, while maintaining closed valves 58, 60 and 56.

In the operation of both adsorber tanks 40 and 42 for treatment of the contaminant in the water, the water is treated first by tank 42 and then by tank 40, valves 44, 48, 50, 70, 58, 56, 19, and 72 are opened; while, valves 54, 76, 64, 66, 59, 60, and 68 are maintained closed. With this valving arrangement the effluent is directed through adsorber tank 42 and then to adsorber tank 40 in an upward flow mode. The final water is then directed to effluent tank 62. Accordingly, if the water is to be used as makeup water in the process, then valve 68 is opened and valve 72 is closed. This sequence directs the water back to the process area.

Sequence No. 3

To regenerate adsorber tank 42 and to place adsorber 40 in primary stage of operation, valves 44, 48, 50, 60, 56, 94 and 72 are opened; while, valves 54, 59, 58, 52, and 68 are closed. Thereafter, in order to regenerate adsorber tank 42 from regeneration tank 80, valves 78, 66, and 82 are opened; while, valves 90, 70, 64, 76, and 52 are maintained closed. Acid is recirculated through adsorber tank 42 until the test probe 84 indicates that the set point has been reached. The acid is then drained back to regeneration tank 80 by opening valve 86.

Adsorber tank 42 is then rinsed with clean water by opening valves 90, 66, and 82; while, maintaining closed valves 78, 59, 70, 76, 64, and 52. After two bed volumes, adsorber tank 42 is ready to be returned to service.

Sequence No. 4

The valving sequence which places adsorber tank 40 first in line in the primary stage followed by adsorber tank 42 includes pumping water from feed tank 34 through open valves 44, 48, 50, 60, 64, 76, 94, and 72; while, maintaining closed valves 54, 59, 58, 56, 52, 82, 70, 66, 68 and 74. With this valving sequence, water through adsorber tanks 40 and 42 is directed in an upward flow mode with the final effluent being directed to tank 62. If clean water is desired to be recycled to the process area, then valve 68 is opened and valve 72 is closed.

In the up flow mode reactivation of the adsorption material occurs when the surface pH exceeds 5.0 and approaches 6.0. Reactivation of the adsorption material is accomplished as above discussed for the down flow mode to restore the surface pH to a preferred initial range between about 1.5 to 2.5.

Electrolytic Recovery

The operation of the electrolytic recovery process involves recirculation of the metal-rich acid in regeneration tank 80 through a metal recovery module 96. The module 96 is preferably a plastic constructed tank with anode and cathode terminals, copper bussing and two agitators with impellers. A commercially available electrolytic metal recovery unit suitable for use with the present invention is available from Tri-State Plastics Co. The recovery operation is accomplished by first opening valves 78, 98, and 100 in a closed loop recirculation mode. During this valving sequence, valves 59, 66, and 90 are maintained closed. Pump 102 recirculates the acid from tank 80 through the metal recovery module 96.

Preferably the metal recovery module 96 includes anodes, cathodes, and a DC power supply where the metal ions are deposited on the cathode surface. Recirculation is continued until the metal ion level is low enough to make acid reusable for another regeneration cycle. By removing the metal ions, the acid ability to strip additional metal from the surface of the granular activated carbon in tanks 40 and 42 is rejuvenated. The suitable acid reuse point is determined by operation of a conductivity meter 104 between valve 100 and the inlet into tank 80.

Preferably the cathodes of the metal recovery module 96 are removable from the unit to permit the recovered metal to be stripped from the cathode surface, and thereby permit additional recovery of metal. Throughout this entire process and operation of the above described regeneration loop, the pH of the metal recovery step is adjustable. When the metal recovery operation is completed and the regeneration system is restored to a standby mode, valves 78, 98, 100 are closed and the supply of DC power to the module 96 is turned off.

EXAMPLE 1

A glass column adsorption tank was filled with 70 grams of Filtrasorb 400 granular activated carbon. The surface of the carbon was pretreated by circulating through the carbon a 20% by volume sulfuric acid solution at a pH in the range between about 1.5 to 2.5 for a period of 72 hours. In this manner, the capacity of the carbon to adsorb chromium was substantially increased by restoring the surface of the carbon to a pH of about 2.0. During the pretreating stage, 840 mls. of concentrated acid (66 Baume) was adsorbed by the carbon. A 250 mg/l hexavalent chromium solution was passed through the bed in a down flow mode at a flowrate of 10 ml/min. The solution pH was adjusted to 3.5–4.5, not to exceed a control point pH of 6 for chromium. A hexavalent chromium free effluent was produced for 4.50 liters with a pH in the range 2.5 to less than 6.0.

Regeneration of the granular activated carbon was performed with 500 ml. of stripping solution consisting of sulfuric acid in a range of 10–20% by volume of pH between 1.5 to 2.5. The stripping solution was recirculated in an up flow mode at 50 ml/min for 1–2 hours. The carbon column was then washed with 500 ml of water and returned to service. The stripping solution contained 2.25 g/l of trivalent chromium.

The stripping solution was held in a storage tank with recirculation equipment to the adsorption media units and the electrolytic metal recovery cell. The stripping was then processed in the EMR unit. The chromium was electrolytically deposited on stainless steel cathodes.

The stripping solution was passed through the EMR unit at a voltage potential of between about 6–12 volts and cathode current densities ranging from 10–100 amp/ft$^2$. The EMR unit included an ion selective membrane compartment around the anode to reduce the tendency of chromium oxidation. The EMR unit produced a blue-green colored deposit on the cathode. The stripping solution was then recycled back to the storage tank for use in the next stripping cycle.

EXAMPLE 2

A glass column adsorption tank was filled with 70 grams of Filtrasorb 400 granular activated carbon. The carbon was pretreated by recirculating through the carbon a 10% by volume caustic solution at a pH in the range 7.0 to 9.0 for a period of 72 hours. A 500 mg/l nickel sulfate solution was passed through the bed in a down flow mode at a flowrate of 10 ml/min. The solution pH was adjusted to 7.0 to 9.0 A nickel free effluent was produced for 8.50 liters with a pH in the range of 7–9.

Regeneration of the granular activated carbon was performed with 500 ml. of stripping solution consisting of sulfuric acid in a range of 10–20% by volume at a pH between 1.5 to 2.5. The stripping solution was recirculated in an up flow mode at 50 ml/min for 1–2 hours. The carbon column was then washed with 500 ml of water and returned to service. The stripping solution now contained 4.5 g/l of nickel.

The stripping solution was held in a storage tank with recirculation equipment to the adsorption media units and the electrolytic metal recovery cell. The stripping was then processed in the EMR unit. The nickel was electrolytically deposited on stainless steel cathodes.

The stripping solution was passed through EMR cell at voltage potential of between about 6–12 volts and cathode current densities ranging from 10–50 amp/ft$^2$. The EMR unit produced a gray foil deposit on the cathode. The stripping solution was recycled back to the storage for use in the next stripping cycle.

With the prior art, heavy metal removal processes using activated carbon, the influent is run through the carbon bed until the pH of the treated effluent exceeds 6 or contains measurable concentrations of the heavy metal. At this point the process is shut down because the activated carbon is regarded as being "exhausted" and unable to remove additional heavy metals with chemical regeneration. The exhausted carbon bed is then removed from the process line and a fresh carbon bed is brought on-line.

Figure 3:
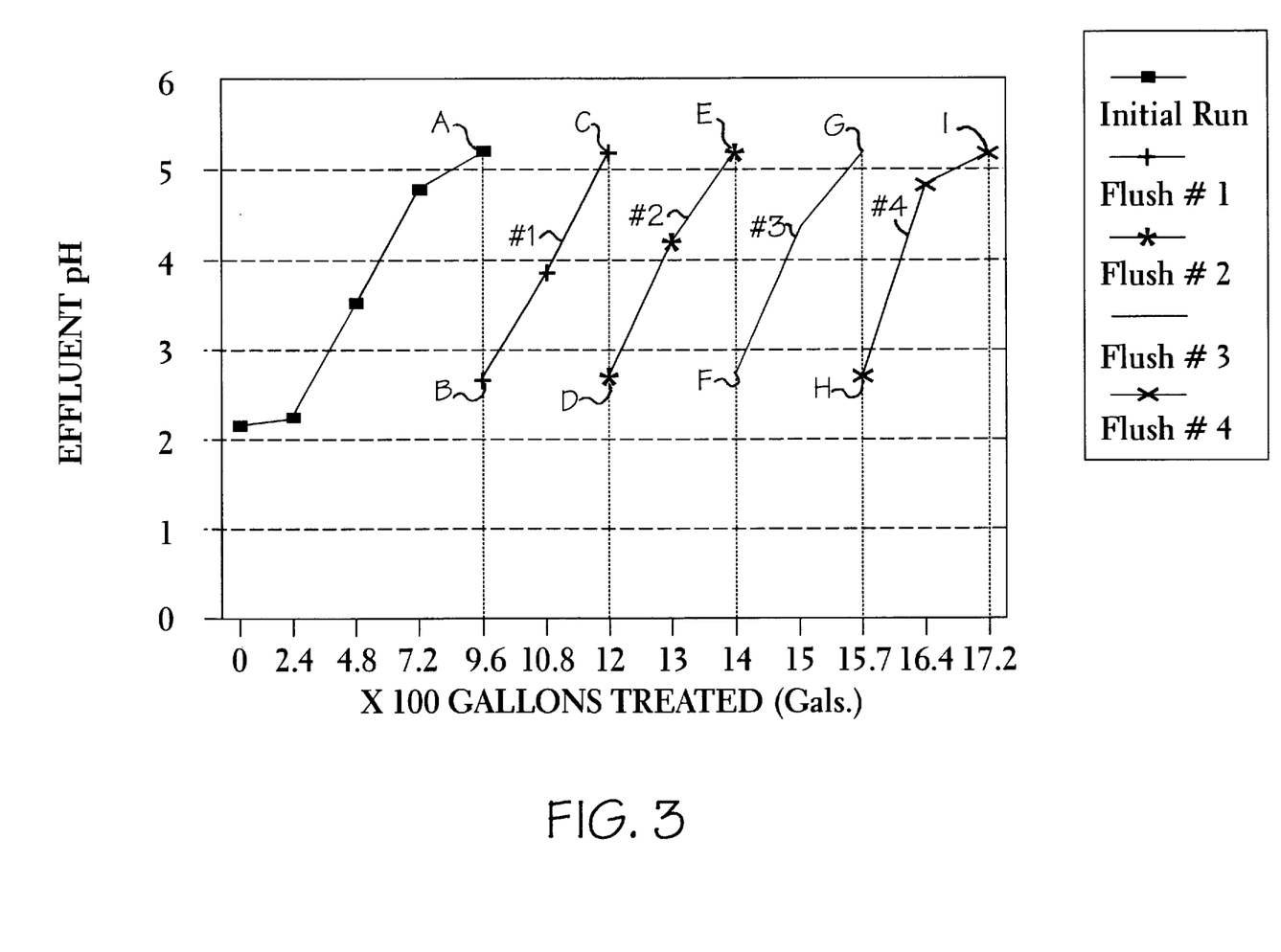
FIG. 3 is a graphic representation of the process for reactivating the activated carbon.

With the present invention as graphically illustrated in FIG. 3, an "exhausted" carbon adsorber is automatically reactivated on-line when the effluent pH exceeds 5 and before the pH reaches the control point of 9. Consequently, increased adsorption capacity is attained with the carbon adsorber without having to remove the adsorber from the process line for regeneration.

The adsorption of heavy metal by activated carbon requires control of both the solution chemistry pH and the activated carbon surface pH to obtain maximum heavy metal removal. The solution pH and the activated carbon surface pH must both be monitored and adjusted to obtain the preferred heavy metal removal results. It is not sufficient to adjust only the solution pH or the activated carbon surface pH.

The capacity of activated carbon to adsorb heavy metal is not exhausted when the effluent pH exceeds the control point (pH 6 for chromium). What occurs at this point is that the acidity of the carbon surface has been consumed by the heavy metal adsorption process. By restoring the surface pH of the carbon in the adsorber to the-initial pretreating conditions, the carbon adsorber is operable to continue the heavy metal removal process.

There are two factors which impact the effectiveness of this on-line reactivation process: (1) strength of the reactivation solution and (2) the time the chemical solution is in contact (soak) with the activated carbon. The chemical solution used to reactivate the activated carbon must have sufficient acidity to restore the pH of the carbon surface to the initial pretreated conditions. However, the chemical solution should not have an acid strength which would strip the metal from the carbon surface. If too strong an acid solution is used, the chemical solution will become contaminated with heavy metal and the activated carbon will not produce a clean low concentration effluent. In the case of chromium, the reactivation pH ranges between about 1.5 to 3.0 and preferably between 1.5 to 2.5. An example of the reactivation process for the activated carbon follows and is graphically illustrated in FIG. 3 with a soak time of 45–60 minutes.

EXAMPLE 3

A carbon adsorber containing 200 pounds of Calgon Carbon Filtrasob 400 was pretreated to a pH of 2.2. The feed waste influent contained 2000 mg/l of hexavalent chromium. The pH of the waste influent was adjusted to 4.5 and processed downflow at a rate of 4 gpm, as graphically illustrated in FIG. 3. The pH of the effluent exiting the carbon adsorber started at 2.2 and gradually increased to a pH of 5.2 at position A after 4 hours of continuous operation. The adsorber was shut down, and an acid solution of pH 2.5 (14 gallons) was pumped upflow into the adsorber until the carbon pore water was displaced and a pH of 2.6 was reached at position B shown in FIG. 3. The carbon soaked in the acid solution for 45 minutes. Thereafter, the carbon adsorber was returned on-line, and the pH of the exiting effluent was 2.6. The carbon adsorber operated an additional 60 minutes or 25% of the original volume until the pH increased to 5.2 at position C shown in FIG. 3.

At position C shown in FIG. 3 the adsorber was again regenerated on-line by pumping upflow into the adsorber an acid solution of 2.5 pH. The adsorber was allowed to soak for 45 minutes. After soaking the system was returned to operation in which an additional 200 gallons was processed until a pH of 5.2 was again reached at position E in FIG. 3. This reactivation process was repeated for two more runs, F to G and H to I.

Each run was operated until the pH approached the control point of 6.0. The run time decreased about 10–15% each time until the last reactivation run lasted 35 minutes. By utilizing this on-line reactivation process, an additional 760 total gallons of waste effluent was treated before the carbon adsorber was removed from service on the process line, as shown in the graph of FIG. 3.

Further, in accordance with the present invention, the adsorption capacity of the activated carbon is enhanced by pretreating the carbon by recirculating a high strength acid solution in contact with the activated carbon. Superior adsorption capacity is attained by recirculating an acid solution in contact with the carbon for up to 72 hours. In essence, the carbon is "cooked" with a 20% by volume acid solution.

Activated carbon has the capacity to adsorb large amounts of acid. For example, virgin activated carbon pretreated in a weak acid solution of pH 4.0 caused the solution pH to increase to a pH of 5.5 after recirculating for 8 hours, indicating that the activated carbon had additional capacity to adsorb more acid.

By pretreating the carbon with a stronger acid solution the carbon adsorbs more chromium. With the present invention, the carbon held 100% more acid than heretobefore available with the prior art processes. For example, acid loading ratios of 1 gallon of concentrated acid per 100 pounds of activated carbon can be adsorber during pretreating to provide chromium loading levels of 5–7.5% which are superior loading levels for Filtrasob 400.

As above-discussed, the activated carbon is regenerated with acid. In the regeneration process, the acid is consumed in the desorbing (stripping) of the heavy metals from the carbon surface. A difficulty is encountered in that as the acid is consumed the solution pH increases and the stripping process stops. The prior art processes use acid concentrations below 10% acid strength and normally experience inferior stripping results.

Activated carbon has the ability to reduce hexavalent chromium to trivalent chromium in the presence of an acidic environment. As the hexavalent chromium is being reduced the acid is consumed in the process. This is substantiated by an observed increase in solution pH as supported by the results disclosed in Example 4 below. If additional acid is not supplied to keep the pH low and provide sufficient acid to complete the chromium reduction process, stripping will stop. This is what happens with a weak acid stripping solution.

Figure 4:
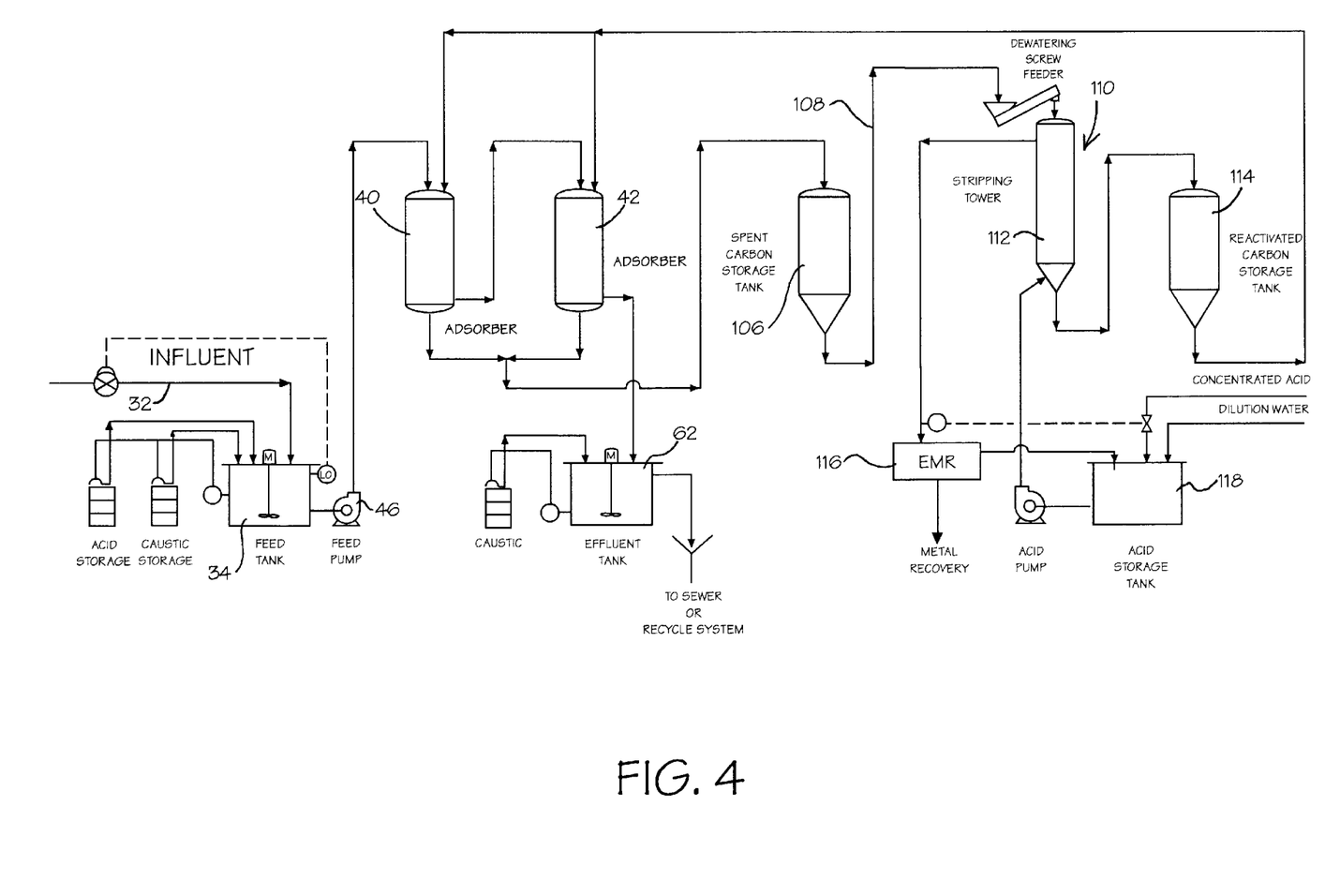
FIG. 4 is a diagrammatic illustration of an additional embodiment of the present invention.

These problems are overcome by the present invention by using a 10–20% acid stripping solution to ensure sufficient acid to complete the metal stripping process. Control of the pH level is accomplished by injecting into the solution additional acid as the initial acid is consumed during the initial metal stripping step. The control set point for the pH unit is 1.5 to 2.5. The pH level is monitored and controlled using commercially available components that include a pH controller, metering pump, pH probe and chemical holding tank, as schematically illustrated in FIG. 4.

EXAMPLE 4

A single bed of exhausted activated carbon from a chromium removal experiment, weighing about 200 grams, was regenerated with 10% sulfuric acid. About 220 ml of acid solution was added to the bed-and allowed to stand for two hours then drained. The initial solution pH was below 1.0 and after a period of two hours the pH increased to 1.8. The acid solution pH increased after being introduced to the chromium laden activated carbon.

The ability to precondition the surface of activated carbon by contacting it with a strong chemical solution is illustrated in Example 5 below. Over 118 liters of water were treated before the pH reached the influent pH. A graphical intregration reveals that the average effluent pH was 1.75 over the 118 hour experiment. This data indicates the ability of activated carbon to be preconditioned thereby changing the surface pH and release the acid slowly over time.

EXAMPLE 5

Figure 5:
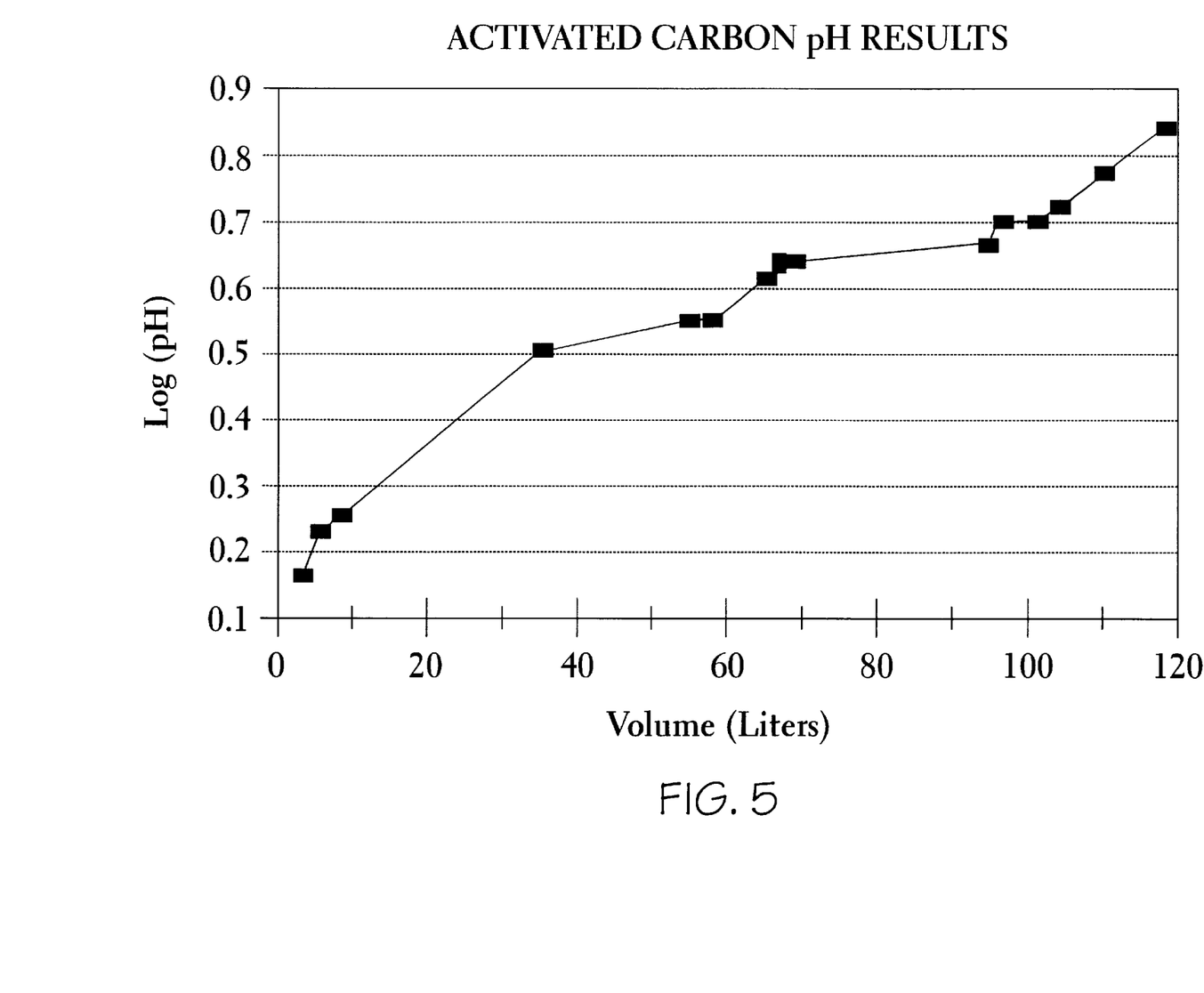
FIG. 5 is a graphic representation of the change over a period of time in the pH of effluent passed through a bed of preconditioned activated carbon.

A neutral water at pH 7.0 was pumped downflow at a flowrate of 20 mls/min through a column containing 180 grams of activated carbon preconditioned with acid to a pH of 1.5. Fresh pH 7.0 water solution was processed over 99 hours before the effluent from the carbon bed approached the influent water pH. A logarithmic plot of the effluent pH verses volume reveals a linear relationship over a major portion of the experiment. A graph of the log of the effluent pH verses the volume throughput is disclosed in FIG. 5.

The chemical regeneration of activated carbon performed in single bed systems have the following disadvantages:

1. need for multiple washing of the carbon bed which generates large quantities of stripping solution, all varying in metal concentration,
2. need for washing the carbon bed with water to remove residual metals which generates a volume of dilute metal concentration solution that adds to the overall disposal problem,
3. need for washing the carbon bed with a pretreatment solution to recondition the carbon for the metal removal cycle, and
4. need for using multiple stripping solutions generates an overall low heavy metal concentration stripping solution which is not readily amenable to electrolytic recovery.

The present invention overcomes the above inherent problems experienced with single bed chemical regeneration by utilizing a pulse bed chemical regeneration process, as illustrated in FIG. 4. The pulse bed process provides the following benefits:

1. The volume of acid required to strip the metals from a unit volume of activated carbon is greatly reduced because the same volume of acid is operable to strip multiple volumes of carbon, resulting in a concentrated heavy metal acid solution.

2. The exiting carbon from the bottom of the pulse bed is clean and does not require additional washing.

3. The time to regenerate the carbon is reduced because the various process steps for single bed processing are eliminated.

4. The cost to operate the pulse column system is significantly lower in comparison to a single bed system.

Referring to FIG. 4, there is illustrated the apparatus for performing the pulse bed chemical regeneration process of the present invention in which like elements illustrated in FIG. 2 are designated by like numerals in FIG. 4. It should be understood that the pulse bed chemical regeneration process is applicable to both acid and caustic removal of heavy metal from a waste effluent.

After either adsorber tank 40 or 42 of activated carbon is exhausted, i.e. the effluent therefrom contains high concentrations of a heavy metal species, the tank is taken off line. The activated carbon is removed from the adsorber tank and the adsorber tank is filled with clean (regenerated) carbon.

The exhausted activated carbon is placed in a holding tank 106 where it is feed by a dewatering screw conveyor 108 or under air or water pressure to the top of a pulse bed column generally designated by the numeral 110. The column 110 includes a vessel 112 where in one embodiment the "clean" acid is fed at the bottom of the vessel 112 and the exhausted carbon enters the top of the vessel 112.

The flow of activated carbon and acid are in countercurrent directions. The acid flows upwardly through the column and the activated carbon flows downwardly through the column. The result is that the activated carbon exiting from the bottom of the vessel 112 is clean and the acid exiting from the top of the vessel 112 has stripped the metals from the activated carbon and is now a concentrated metal acid stream.

The carbon is removed from the vessel 112 on a predetermined basis, normally once per hour and conveyed to a storage tank 114. The acid is conveyed from the vessel 112 to a collection tank where it is stored until processed in an EMR unit 116. The amount of activated carbon removed from the pulse column 110 should not be any greater than $1/10$–$1/12$ per pulse period. The cleaned activated carbon exiting the bottom of the vessel 112 is drained. The free acid is returned to acid feed tank 118.

The cleaned carbon is stored until sufficient activated carbon is collected to fill one of the carbon adsorber tanks 40 and 42. The clean acid is 10–20% concentration by volume or has a specific gravity of 1.2 to 1.3. The exiting acid contains 20–30 grams per liter of heavy metals and has a pH between about 3.5 to 5.

According the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A method for reclaiming heavy metal from waste water comprising the steps of, adjusting the pH of waste water to a range between about 2 to 9, pretreating the surface of a bed of adsorption material by a chemical solution having a pH in the range between about 2 to 9, passing the waste water in a stream through a bed of pretreated adsorption material, adsorbing the heavy metal present in the waste water onto the surface of the adsorption material, directing the waste water free of the heavy metal as an effluent stream away from the bed of adsorption material for discharge, monitoring the pH of the effluent stream exiting the bed of adsorption material to evaluate the capacity of the bed to adsorb the heavy meatal while the bed remains on line, detecting an increase in pH of the effluent stream to a preselected control point, supplying an acid solution of a preselected pH to reactivate the bed of adsorption material while on line when the pH of the effluent stream reaches the control point to restore the adsorptive capacity of the bed, maintaining the acid solution in contact with the bed of adsorption material for a preselected period of time until the pH of the surface of the bed of adsorption material is restored to a preselected pH level, passing an acid stripping solution through the bed of adsorption material to strip the heavy metal from the surface of the adsorption material, passing the stripping solution containing the heavy metal to an electrolytic recovery unit, electrolytically depositing the heavy metal from the stripping solution onto a cathode terminal in the electrolytic unit, recovering the heavy metal deposited onto the cathode terminal, and reusing the retained stripping solution in subsequent cycles of stripping heavy metal from the surface of the adsorption material.

2. A method for reclaiming heavy metal from waste water as set forth in claim 1 which includes, circulating an acid solution containing sulfuric acid in a range of 10–20% by volume at a pH between 1.5 to 2.5 through the bed to regenerate the bed for adsorption of heavy metal from the waste water stream.

3. A method for reclaiming heavy metal from waste water as set forth in claim 2 which includes, circulating the acid solution through the bed of adsorption material at a preselected flow rate for a period of 1 to 2 hours.

4. A method for reclaiming heavy metal from waste water as set forth in claim 1 which includes, interrupting adsorbing the heavy metal from the waste water stream onto the surface of the adsorption material when the effluent stream exceeds a pH of 5.0 and before the pH reaches 9.0, circulating an acid solution containing sulfuric acid in a range of 10–20% by volume at a pH between 1.5 to 2.5 through the adsorption material until the pH of the surface of adsorption material is about 2.0, and resuming the flow of the waste water through the bed of adsorption material to adsorb the heavy metal onto the surface of the bed until the pH of the effluent stream passing away from the bed reaches a pH in the range between about 5.0 to 6.0.

5. A method for reclaiming heavy metal from waste water as set forth in claim 4 which includes, recirculating the acid solution through the adsorption material for a period of eight hours to restore the surface pH of the adsorption material to a level for adsorbing the heavy metal onto the surface of the adsorption material.

6. A method for reclaiming heavy metal from waste water as set forth in claim 1 which includes, pretreating the surface of the bed of adsorption material by circulating through the bed a solution containing 20% by volume a pretreating acid for a period of time up to 72 hours.

7. A method for reclaiming heavy metal from waste water as set forth in claim 6 which includes, reactivating the surface of the bed of adsorption material by circulating through the bed a sulfuric acid solution having a pH at a level to restore the capacity of the bed to adsorb heavy metal without stripping from the bed the heavy metal absorbed in the bed.

8. A method for reclaiming heavy metal from waste water as set forth in claim 1 which includes, pretreating the surface of the bed of adsorption material by circulating through the bed a sulfuric acid solution having a pH between about 1.5 to 2.5 for about 1 hour.

9. A method for recovering chromium from a waste water stream comprising the steps of, adjusting the pH level of a waste water stream containing hexavalent chromium to a range between about 2 to 6, pretreating a bed of activated carbon by circulating in a closed loop a solution containing 10% to 20% by volume sulfuric acid through the bed of activated carbon for a preselected period of time until the pH of the surface of the bed reaches a level of 1.5 to 2.5, directing the waste water stream containing hexavalent chromium through the bed of activated carbon, adsorbing the hexavalent chromium onto the surface of the activated carbon bed, converting the hexavalent chromium to trivalent chromium on the surface of the activated carbon bed, monitoring the pH of the waste water stream exiting the bed of activated carbon to evaluate the capacity of the bed to adsorb the hexavalent chromium while the bed remains on line, detecting an increase in the pH of the waste water stream to a preselected control point, supplying an acid solution of a preselected pH to reactivate the activated carbon bed while in operation when the pH of the waste water stream reaches the control point to restore the adsorptive capacity of the bed, maintaining the acid solution in contact with the activated carbon bed for a preselected period of time until the pH of the surface of the carbon bed is restored to a preselected pH level, passing a stripping solution containing 10% to 20% by volume sulfuric acid through the activated carbon bed to strip the trivalent chromium from the bed, maintaining the pH of the stripping solution at a level between about 1.5 to 2.5 by feeding fresh acid into the stripping solution to continue the stripping of trivalent chromium from the bed, directing the stripping solution containing trivalent chromium to an electrolytic recovery unit, electrolytically depositing trivalent chromium from the stripping solution onto a cathode terminal of the electrolytic recovery unit, and removing the deposited chromium from the cathode terminal.

10. A method for recovering chromium from a waste water stream as set forth in claim 9 which includes, interrupting the steps of directing a flow of waste water through the activated carbon bed and passing the stripping solution through the activated carbon bed, and circulating an acid solution having a pH of 2.0 through the activated carbon bed for a preselected period of time to restore the surface of the activated carbon bed to a pH of about 1.0.

11. A method for recovering chromium from a waste water stream as set forth in claim 10 which includes, continuing the flow of waste water through the activated carbon bed followed by passing the stripping solution through the activated carbon bed until the waste water stream passing from the bed exceeds a pH of about 5.0, and interrupting the steps of directing a flow of waste water through the activated carbon bed and passing the stripping solution through the activated carbon bed to repeat the step of restoring the surface of the activated carbon bed to a pH of about 2.5.

12. A method for recovering chromium from a waste water stream as set forth in claim 11 which includes, repeating the steps of directing waste water through the activated carbon bed, passing the sulfuric acid stripping solution through the activated carbon bed, and maintaining the surface of the activated carbon bed at a pH of about 2.0 to maintain continuous operation of the recovery of chromium from the waste water until the bed reaches its capacity to remove chromium from the waste water stream.

13. A method for recovering chromium from a waste water stream as set forth in claim 9 which includes, pretreating the bed of activated carbon by circulating the 10 to 20% by volume sulfuric acid stripping solution through the bed for a period of time of up to 72 hours.

14. A method for recovering chromium from a waste water stream as set forth in claim 9 which includes, maintaining the surface acidity of the activated carbon bed at a pH of between about 1.5 to 2.5.

* * * * *